E. A. NEWMAN.
EXCAVATING APPARATUS.
APPLICATION FILED SEPT. 3, 1907.

964,999.

Patented July 19, 1910.
6 SHEETS—SHEET 1.

E. A. NEWMAN.
EXCAVATING APPARATUS.
APPLICATION FILED SEPT. 3, 1907.

964,999.

Patented July 19, 1910.
6 SHEETS—SHEET 5.

Witnesses

Inventor
Edwin A. Newman

E. A. NEWMAN.
EXCAVATING APPARATUS.
APPLICATION FILED SEPT. 3, 1907.

964,999.

Patented July 19, 1910.
6 SHEETS—SHEET 6.

Witnesses

Inventor
Edwin A. Newman

UNITED STATES PATENT OFFICE.

EDWIN A. NEWMAN, OF WASHINGTON, DISTRICT OF COLUMBIA.

EXCAVATING APPARATUS.

964,999.  Specification of Letters Patent.  Patented July 19, 1910.

Application filed September 3, 1907. Serial No. 391,080.

*To all whom it may concern:*

Be it known that I, EDWIN A. NEWMAN, a citizen of the United States of America, and a resident of the city of Washington, District of Columbia, have invented a new and useful Improvement in Excavating Apparatus, of which the following is a specification.

This invention relates to those types of excavating apparatus in which endless series of scraping and conveying buckets are or may be employed, and especially to such apparatus designed for use on land as channel excavators and for digging ditches and the like.

The present invention consists in certain novel combinations of parts hereinafter described and claimed.

The leading object of this invention is to provide mechanical means for excavating channels for natural streams, and for irrigation and drainage purposes, with slopes at an angle as low as 1′ to 3′ if desired; the apparatus to be adapted at the same time for use when the construction of dikes is the main object; whereby slopes are produced on which sod can be readily grown, and hay or the like mowed down to the water level, so as to utilize the area represented by the slopes, and at the same time to maintain them in their original shape, even in soft or sandy soil.

Other objects of the invention are to provide for light-weight apparatus of large capacity; to obviate the employment of bucket-tilting devices; to provide for operating the bucket by endless cables of wire rope; to provide for driving the bucket cables and manipulating the ladders from either or both sides of the channels; to provide for moving the apparatus along the line of cut; to provide for propelling the apparatus, manipulating the ladders and operating the buckets by one and the same gasolene engine or the like carried by one or each of the cars forming part of the apparatus; to provide for compacting the erected apparatus and for moving it by its own power from place to place without taking it apart; and to accommodate the apparatus to the ordinary tracks and sidings of railways, so as to facilitate its transportation by rail.

Other objects will be set forth in the general description which follows.

Six sheets of drawings accompany this specification as part thereof.

Like reference characters refer to like parts in all the figures.

In constructing an excavating apparatus according to this invention, one or a pair of cars, A or $A^2$ or $A^3$ or $A^4$ or $A^5$, of peculiar construction, have pivoted thereto a ladder or ladders, B or $B^2$ or $B^3$ or $B^4$; and an endless series of scraping and conveying buckets, C or $C^2$ or $C^3$ or $C^4$, is supported by each ladder. Means for propelling the car or cars, parallel with the line of cut at least, means for manipulating the ladder or ladders, and means for operating the buckets, are also common to all forms of the apparatus; and these and other details will now be pointed out in the selected species (Figs. 1—11), and in the several modifications.

The apparatus of the first species includes two cars, A, which are or may preferably be of one and the same pattern, and each of which is constructed and equipped as follows: (See Figs. 3–6.) The cars are constructed with end compartments, 1 and 2, which may serve respectively as an engine or motor room and as a caboose. Between these, a central compartment, 3, is open at the bottom and sides of the car, which is of truss-frame metallic construction, as indicated in Figs. 3–6, and so braced by through I-beams, 4, above said central compartment as to possess the requisite strength and rigidity. The adjoining ladder, B, extends through said central compartment, 3, a convenient distance to a point above the dump, and is movable on the axis of a horizontal pivot, 5, supported by the car within said compartment.

Figure 4:
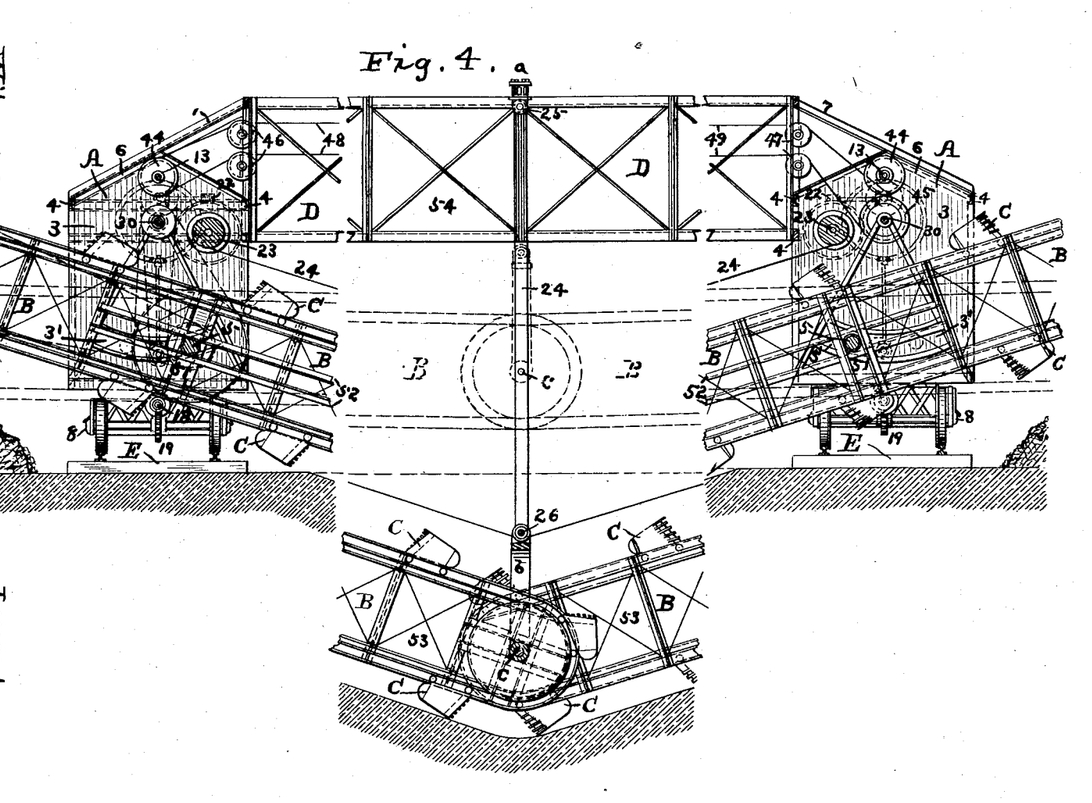
Fig. 4 represents portions of said sectional elevation, Fig. 2, on the same scale as Fig. 3.

The roof of the car A has a corresponding central opening or skeleton portion, 6, which has an upward extension, 7, Fig. 4, at one side, to which the adjoining end of a light truss bridge, D, is bolted, to connect the two cars above the ladders B.

Figures 1, 2:
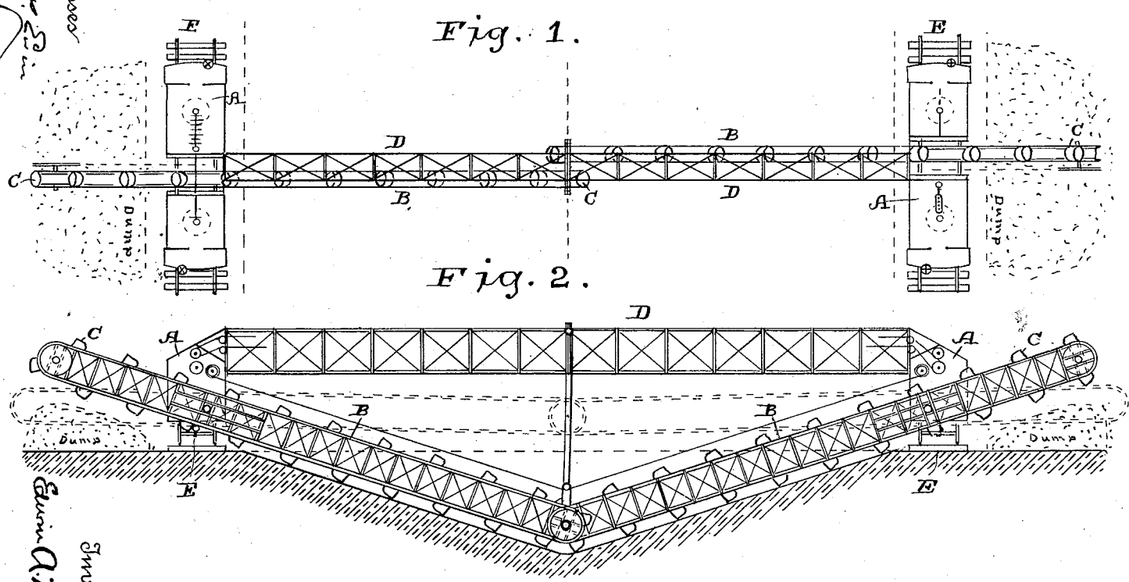
Figures 1 and 2 are respectively a sectional plan view and a sectional elevation projected therefrom, illustrating the construction and operation of a channel excavator embodying all the parts of the present invention.
Figure 5:
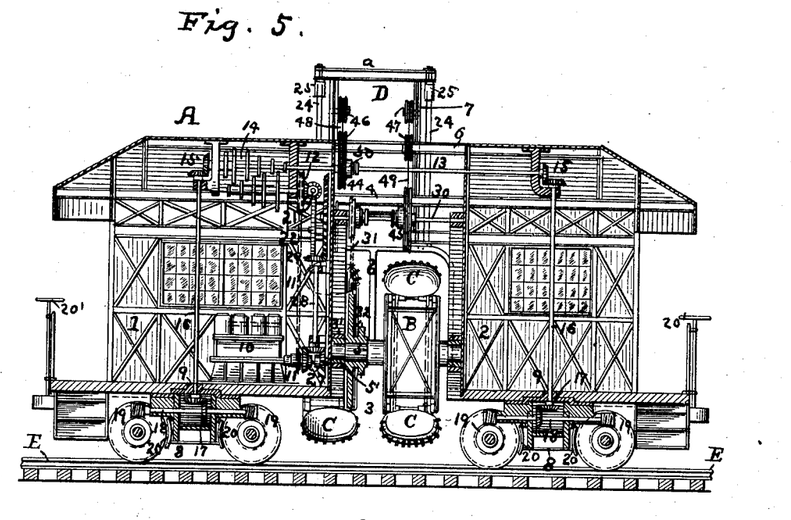
Fig. 5 represents a longitudinal section through one of the cars, showing the same arranged for travel endwise parallel with the line of cut.
Figure 6:
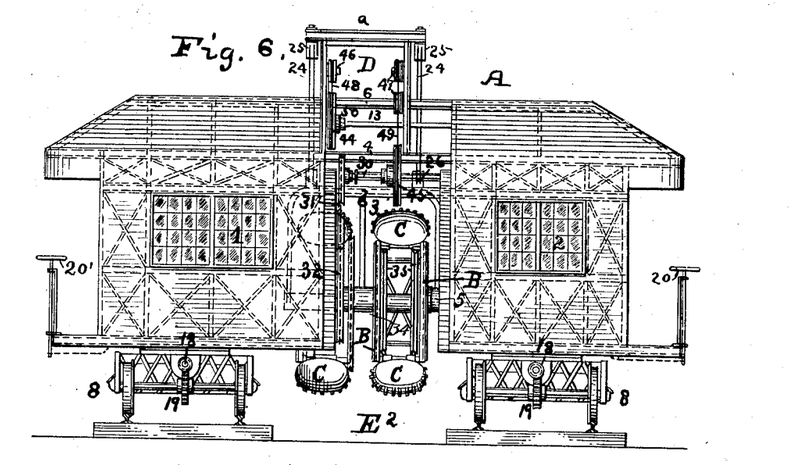
Fig. 6 represents a side view of the same car arranged to travel sidewise.
Figure 7:
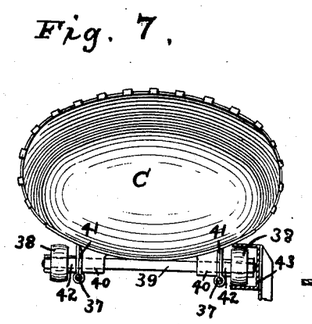
Figs. 7 and 8 are detail views of one of the buckets on a larger scale.
Figure 8:
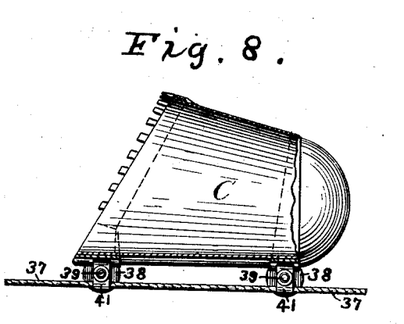
Figure 9:
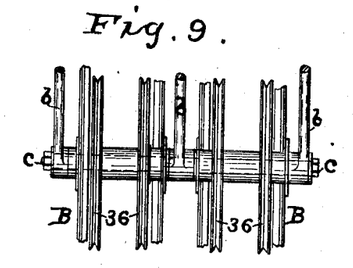
Fig. 9 is a detail view showing the arrangement of bucket-cable sheaves at the central hinge connecting the ladders in Figs. 1 to 4 inclusive.

Each car is supported so as to be movable individually or as a part of the apparatus, by a pair of four-wheel trucks, 8, beneath its respective ends; all the axles being preferably driving axles, and both trucks swiveled to the sills of the car body by hollow king bolts, 9, Fig. 5.

For propelling the car either endwise, as in Figs. 1–5, or sidewise, as in Fig. 6, motion is preferably transmitted from a high-speed gasolene engine, 10, Fig. 5, in the motor room 1, by a sprocket pinion, 11, on its shaft, driving a chain 11', to a sprocket-wheel countershaft, 12, in the top of the car; the shaft of which, together with a corresponding portion of a superjacent line shaft, 13, is provided with a suitable number of change-of-speed gears and reversing gears, 14, with their customary appurtenances. The ends of said line shaft 13 are connected by bevel gears, 15, with vertical shafts, 16, concentric with the trucks 8, and these shafts extend downward through the king bolts 9, and are connected by bevel gears, 17, to countershafts, 18, which in turn drive the several axles through worm gearing, 19. The cars A are further equipped with brakes, 20, Fig. 5, and brake operating devices, 20'; but these will only be required after the worm gearing 19 is unclutched from the axles when the cars are to be pulled by locomotives. The two cars of the first species are ordinarily guided by temporary railway tracks, E, parallel with the line of cut, on the opposite sides of the channel, and the trucks and tracks are or may be of standard measurements. When the cars are moved sidewise to shift the apparatus as a whole by its own power, the cars are guided by double tracks, E², Fig. 6, laid temporarily as may be required. For manipulating the ladders B, motion is transmitted from said sprocket-wheel countershaft, 12, Fig. 5, through bevel gears, 21, to the countershaft of worm gearing, 22, which drives a drum, 23, Figs. 3 and 4, in the upper part of said central compartment 3 of the car. This drum 23 takes up or lets out the rope, 24, of a block and tackle, the sheaves, 25 and 26, of which are carried respectively by an overhead beam, a, Figs. 3–6 and Fig. 11, supported centrally by the bridge D, and a yoke, b, coupled to a horizontal bolt, c, by which the inner ends of the ladders B are hinged together side by side. For the details of this hinge joint, compare Figs. 3, 4 and 9.

It will be understood that there is a block and tackle 24—26 for each of the two ladders, and that the beam a and yoke b are common to both.

Figure 10:
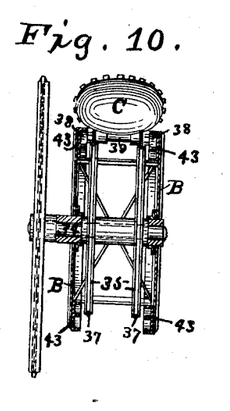
Fig. 10 represents a cross section through one of the ladders showing a bucket in its relation thereto.
Figure 11:
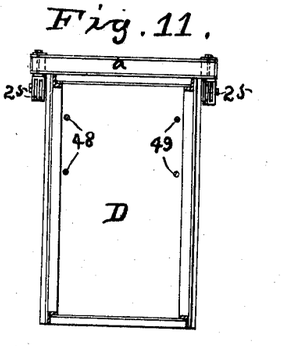
Fig. 11 represents a cross section of the bridge shown in Figs. 1 to 6 inclusive.

For operating the buckets C, motion is transmitted from the shaft of the engine 10, Fig. 5, by bevel gears, 27, to an upwardly extending shaft, 28, which is connected by bevel gears, 29, with a horizontal sprocket-wheel shaft, 30; from the sprocket wheel of this shaft a chain, 31, drives a sprocket wheel and pinion, 32, loose on the ladder pivot 5; and from this sprocket pinion a chain, 33, drives a sprocket wheel and shaft, 34, Figs. 6 and 10, at the dump end of the ladder B. The shaft last named carries the drivers of two pairs of cable wheels, 35 and 36, which are respectively fast thereon, and loose on said hinge bolt c. (Compare Figs. 9 and 10.) The wheels of each pair may conveniently be fast on a hub or sleeve shaft common to both. Endless cables, 37, are stretched around and between said wheels 35 and 36, side by side, and each of the buckets C is frictionally clamped to both cables of one of the ladders B, as in Figs. 7, 8 and 10, which see. Each bucket is provided with two pairs of guide wheels, 38, near its respective ends, on a pair of transverse axles, 39, attached to the bucket by two pairs of lugs, 40, Fig. 7, formed on or attached to the bucket. A cable-attaching clamp, 41, Figs. 7 and 8, abuts against each of these lugs, and is tightened by a clamping member, 42, Fig. 7, in the form of a nut interacting with a screw-threaded portion of the axle 39. The guide-wheels 38 interact with a pair of endless guides, 43, forming part of the ladder B, one of which is shown in cross section in Fig. 7.

It will be understood that ordinarily and preferably each of the cars A of the first species, Figs. 1–11, will contain an engine or motor, 10, and motion-transmitting mechanism as above described. To provide for coupling and synchronizing the two systems, the line shaft 13 of the car-propelling mechanism and the sprocket-shaft 30 of the bucket-operating mechanism are respectively provided with clutch-fastened grooved wheels, 44 and 45, Figs. 3 and 6, in line with which the bridge-attaching extension 7 of each of the cars A is provided with guide sheaves, 46 and 47, and, between the respective pairs of wheels 44 and 45, endless wire ropes or equivalent driving bands, 48 and 49, are stretched from car to car through the bridge D. See Fig. 11. By unclutching either of the coupling wheels 44 of the propelling system, the respective cars may be propelled at different speeds around curves, and the sprocket wheels and shafts 30 being also clutch-fastened, as indicated at 50 in Figs. 5 and 6, the power of both engines may be concentrated at will on one series or the other of the buckets C. Ordinarily, the power of both systems is equalized, and the speed of both is kept uniform.

Figure 3:
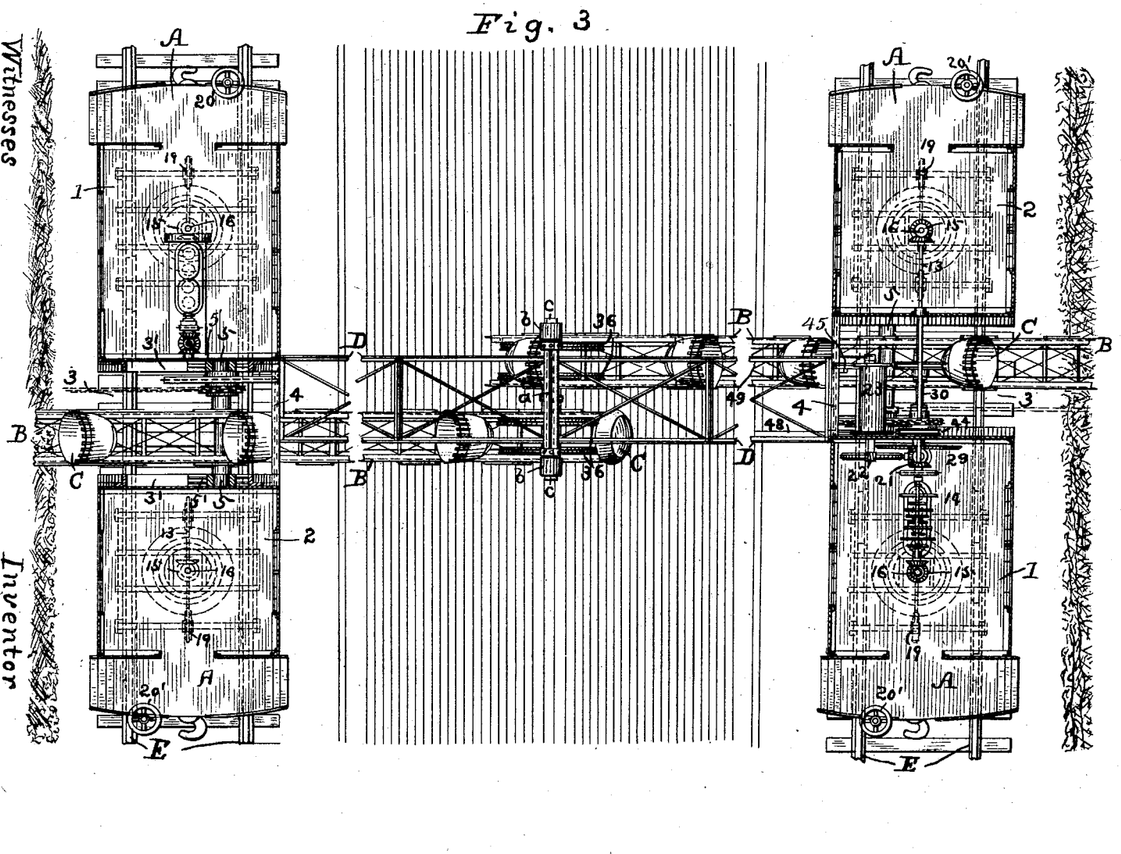
Fig. 3 represents portions of said plan view, Fig. 1, on a larger scale.

For accommodating the fulcrums, 5', Figs. 3 and 5, of the ladder pivots 5, supported by the cars A, to the lateral movement of said pivots when the ladders B of the first species are raised or lowered at their hinge joint, said fulcrums are made in the form of blocks slidable within ways, 3', in the shape of arcs of circles, with the axes of the sprocket-wheel shafts, 30, as the centers, as best shown in Fig. 4. The pivots 5 are stayed within the respective ladders B by pairs of transverse beams, 51, crossed by a central pair of like beams, 52, arranged longitudinally, as shown in Fig. 4.

To provide for shortening the ladders B and bridge D of the first species, to adapt the apparatus to cut narrower channels with economy, each of the ladders B is made with one or more of its sections, 53, Fig. 4, between its hinge and its pivot removable, and the bridge D is correspondingly constructed with a removable panel or removable panels, 54, Fig. 4. The standard ladders and bridge may be lengthened in like manner within their limits of strength by inserting additional panels. In the case of the bridge D it is not necessary to remove more than one panel in order to accommodate the block and tackle beam $a$, as the latter may be supported on the bridge at any point.

In the modified species represented by Fig. 12, a pair of cars, $A^2$, a single ladder, $B^2$, of any required length, a single series of buckets, $C^2$, supported by such ladder, and a bridge, $D^2$, are used in connection with tracks, E (and $E^2$), in the manner above described with reference to the cars A, ladders B, buckets C, and bridge D, Figs. 1–11; and may be of the same construction and equipment, except that the fulcrum guides 3', Fig. 4, within the central compartment 3, may be dispensed with, or the fulcrum blocks 5', Figs. 3 and 5, may be fastened in place. This arrangement (Fig. 12) provides for a dump on one side only of the channel. The car propelling devices hereinbefore described are represented in Fig. 12 by their swiveled trucks at 8, by their line shaft at 13, and by their worm gearing at 19; the ladder-manipulating devices are represented by a ladder pivot at 5 and a windlass at 23; the block and tackle rope is represented at 24, its sheaves at 25 and 26, the bridge-supported beam at $a$, a ladder yoke at $b$, and a pivotal rod at $c$ attaching said yoke to the ladder; the bucket operating devices are represented by their sprocket wheels and shafts at 30 and 34, and by one of the bucket guides at 43; and the coupling and synchronizing devices are represented by those of the propelling mechanism at 44, 46 and 48.

Figures 12, 13, 14, 15, 16:
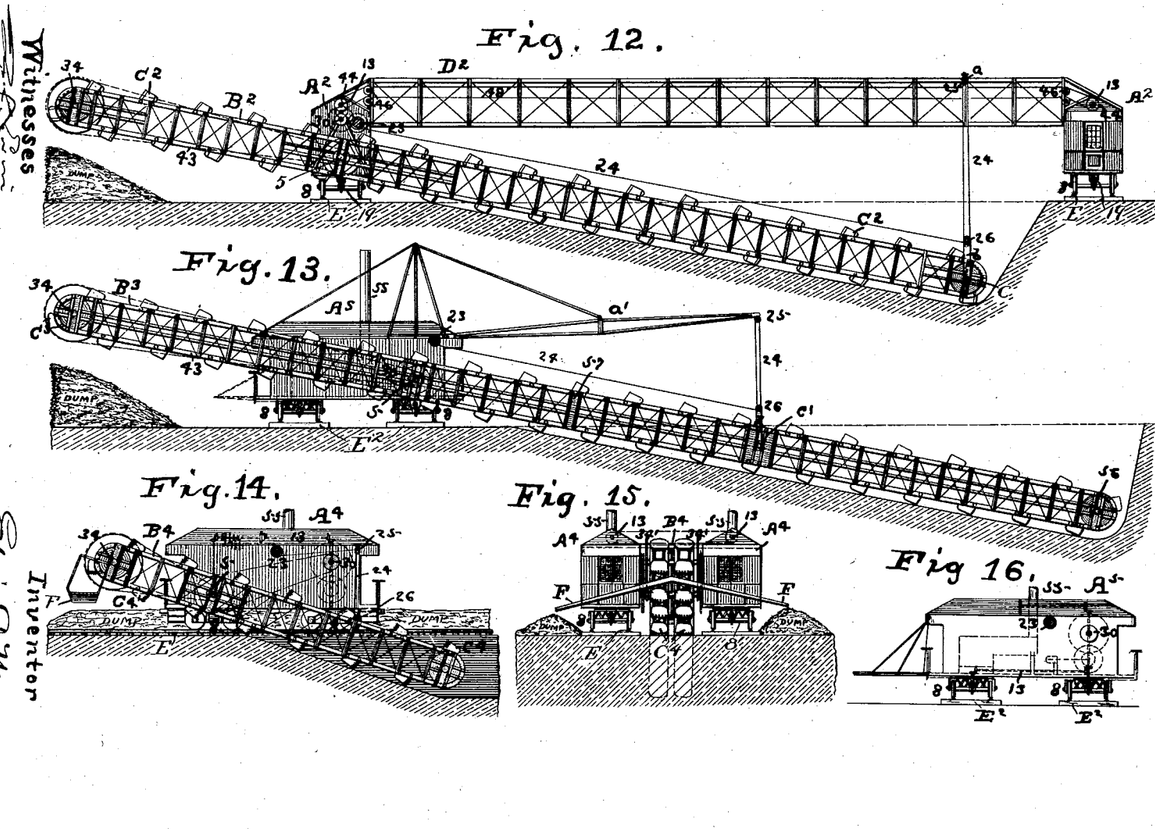
Fig. 12 is a sectional elevation illustrating modifications of the apparatus.
Fig. 13 is a like view of another modified apparatus.
Figs. 14 and 15 are respectively a similar view and a view at right angles thereto showing a ditching apparatus constructed on the same principle and embodying the same invention in part.
Fig. 16 is a small scale view of a modified car arranged to travel sidewise.

In the modified species represented by Fig. 13, a pair of cars, $A^3$, are moved sidewise along the line of cut on a double track, $E^2$; a long single ladder, $B^3$, being supported by a pivot, 5, between the two cars, and a single series of buckets, $C^3$, supported by said ladder, discharging upon a dump at one side of the channel as in Fig. 12. One or each of the cars $A^3$ in this arrangement may preferably be equipped with a steam boiler, represented at 55, as the additional weight can be utilized to advantage. The car propelling devices may be identical with those above described, as represented by their swiveled trucks 8. The ladder-manipulating devices are modified by the employment of a boom derrick, $a'$, carried by one or both cars to support the upper block-and-tackle sheave, 25, in the absence of an overhead bridge. The windlass 23 is supported between the two cars, and the rope 24 interacts with a lower sheave 26, carried by a yoke, $b$, attached to the ladder $B^3$ by a pivotal rod, $c'$, at a point midway between its channel extremity and said pivot 5. The bucket operating devices are modified to adapt them to the location of the ladder $B^3$ and series of buckets $C^3$ parallel with the cars $A^3$. A low down location of the sprocket-wheel shaft 30 is represented. The sprocket-wheel shaft 34 and its appurtenances may be identical with those before described. The cable-wheel shaft, 56, at the channel end of the ladder, and its appurtenances, may be similar to those shown at $c$ in Figs. 1–12, or of any approved construction. The bucket guides 43 and their appurtenances may also be similar to those before described. A central joint, 57, in the long ladder $B^3$ provides for readily taking it apart for transportation.

In the modified species represented by Figs. 14 and 15, a pair of cars, $A^4$, are moved endwise parallel with the line of cut on single tracks, E, and carry between them a double-width ladder, $B^4$, and its pivot, 5; two endless series of buckets, $C^4$, being mounted side by side on said ladder, and discharging, with the aid of a chute, F, upon dumps extending on both sides of the ditch or ditch-shaped channel which this arrangement of apparatus is designed for cutting. The chute F is supported by the dump end of the ladder B⁴. See Fig. 14. The cars are equipped with steam boilers and engines, as represented by their smokestacks at 55. The car-propelling devices may be identical with those before described, as represented by their swiveled trucks, 8, and line shafts 13. The ladder-manipulating devices comprise, as in Fig. 13, a windlass, 23, supported between the cars, together with block-and-tackle ropes, 24, and sheaves, 25 and 26, the upper sheaves 25 being attached to the respective cars and the lower sheaves to the ladder B⁴ direct. The modified bucket-operating devices include sprocket-wheel shafts, 30 and 34, parallel with the ends of the cars, as in Fig. 12, and the shaft, 34, at the dump end of the ladder B⁴, carries a pair of sprocket wheels, as shown at 34′, in Fig. 15, and serves itself to couple and synchronize the machinery of both cars in the cutting operation.

The modification illustrated by Fig. 16 consists in a low-down arrangement of the line shaft, 13, of the above described car-propelling devices. It is shown applied to a car, A⁵, movable sidewise along the line of cut on a double track, E², and equipped with a steam boiler and engine, 55, as in Fig. 13; but may obviously be embodied in any of the cars except those represented in Figs. 1–6 and to the left in Fig. 12. Swiveled trucks, as above described, are represented in Fig. 16 at 8; ladder manipulating devices, as in Figs. 14 and 15, are represented by their windlass 23, and bucket operating devices are represented by their sprocket-wheel shaft 30.

It will be apparent that in each of the arrangements there may be a plurality of series of buckets supported by each ladder, as in Figs. 14 and 15; and that in this arrangement (Figs. 14 and 15) there may be a single series of buckets for narrow ditches or more than two series side by side; and other like modifications will suggest themselves to those skilled in the art.

Having thus described said improvement, I claim as my invention and desire to patent under this specification:

1. In a channel excavating apparatus, the combination of a pair of tracks parallel with each other on opposite sides of the channel, a pair of cars movable on said tracks respectively, a bridge connecting said cars, a pair of ladders pivotally connected with said cars, connected with each other midway between the cars by a hinge joint and extending outward beyond the respective cars, an endless series of scraping and conveying buckets supported by each of said ladders and discharging at the outer ends of the respective ladders, and means for propelling the cars along said tracks and for manipulating the ladders and operating the buckets.

2. In a channel excavating apparatus, the combination of a pair of tracks parallel with each other on opposite sides of the channel, a pair of cars movable on said tracks respectively, a bridge connecting said cars, a pair of ladders pivotally connected with said cars, connected with each other midway between the cars by a hinge joint and extending outward beyond the respective cars, an endless series of scraping and conveying buckets supported by each of said ladders and discharging at the outer ends of the respective ladders, means for propelling the cars along said tracks, and car-supported means for manipulating the ladders and operating the buckets.

3. In a channel excavating apparatus, the combination of a pair of tracks parallel with each other on opposite sides of the channel, a pair of cars movable on said tracks respectively, a bridge connecting said cars, a pair of ladders pivotally connected with said cars, connected with each other midway between the cars by a hinge joint and extending outward beyond the respective cars, an endless series of scraping and conveying buckets supported by each of said ladders and discharging at the outer ends of the respective ladders, and means carried by the cars for propelling them along said tracks and for manipulating the ladders and operating the buckets.

4. In a channel excavating apparatus, the combination of a pair of tracks parallel with each other on opposite sides of the channel, a pair of cars movable endwise on said tracks respectively and each constructed with a central compartment open at the bottom and sides of the car, a bridge connecting said cars at their top, a pair of ladders beneath said bridge pivotally connected with the respective cars within said central compartment, connected with each other midway between the cars by a hinge joint and extending outward beyond the respective cars, an endless series of scraping and conveying buckets supported by each of said ladders and discharging at the outer ends of the respective ladders, and means for propelling the cars along said tracks and for manipulating the ladders and operating the buckets.

5. In a channel excavating apparatus, the combination of a pair of tracks parallel with each other on opposite sides of the channel, a pair of cars movable endwise on said tracks respectively and each constructed with a central compartment open at the bottom and sides of the car, a bridge connecting said cars at their top, a pair of ladders beneath said bridge pivotally connected with the respective cars within said central compartment, connected with each other midway between the cars by a hinge joint and extending outward beyond the respective cars, an endless series of scraping and conveying buckets supported by each of said ladders and discharging at the outer ends of the respective ladders, means for propelling the cars, and car-supported means for manipulating the ladders and operating the buckets.

6. In a channel excavating apparatus, the combination of a pair of tracks parallel with each other on opposite sides of the channel, a pair of cars movable endwise on said tracks respectively and each constructed with a central compartment open at the bottom and sides of the car, a bridge connecting said cars at their top, a pair of ladders beneath said bridge pivotally connected with the respective cars within said central compartment, connected with each other midway between the cars by a hinge joint and extending outward beyond the respective cars, an endless series of scraping and conveying buckets supported by each of said ladders and discharging at the outer ends of the respective ladders, and means carried by the cars for propelling them along said tracks and for manipulating the ladders and operating the buckets.

7. In a channel excavating apparatus, the combination of a pair of tracks parallel with each other on opposite sides of the channel, a pair of cars movable on said tracks respectively, a bridge connecting said cars with each other and constructed with removable sections to provide for making the same longer or shorter, a pair of ladders pivotally connected with the respective cars, connected with each other midway between the cars by a hinge joint, having their dump ends beyond the respective cars and constructed with removable sections between their pivots and said hinge joint, an endless series of buckets supported by each of said ladders, and means for propelling the cars and for manipulating the ladders and operating the buckets.

8. In a channel excavating apparatus, the combination of a pair of tracks parallel with each other on opposite sides of the channel, a pair of cars movable on said tracks respectively, a bridge connecting said cars with each other and constructed with removable sections to provide for making the same longer or shorter, a pair of ladders pivotally connected with the respective cars, connected with each other midway between the cars by a hinge joint, having their dump ends beyond the respective cars and constructed with removable sections between their pivots and said hinge joint, an endless series of buckets supported by each of said ladders, means for propelling the cars, and car-supported means for manipulating the ladders and operating the buckets.

9. In a channel excavating apparatus, the combination of a pair of tracks parallel with each other on opposite sides of the channel, a pair of cars movable on said tracks respectively, a bridge connecting said cars with each other and constructed with removable sections to provide for making the same longer or shorter, a pair of ladders pivotally connected with the respective cars, connected with each other midway between the cars by a hinge joint, having their dump ends beyond the respective cars and constructed with removable sections between their pivots and said hinge joint, an endless series of buckets supported by each of said ladders, and car-supported means for propelling the cars and for manipulating the ladders and operating the buckets.

10. In a channel excavating apparatus, the combination of a pair of tracks parallel with each other on opposite sides of the channel, a pair of cars movable endwise on said tracks respectively and each constructed with a central compartment open at the bottom and sides of the car and provided with slidable fulcrums and arc-shaped guides therefor within such compartment, a bridge connecting said cars at their top, a pair of ladders beneath said bridge pivotally connected with the respective cars by pivots movable in said fulcrums and also movable therewith within said central compartment, said ladders being connected with each other midway between the cars by a hinge joint and extending outward beyond the respective cars, an endless series of scraping and conveying buckets supported by each of said ladders and discharging at the outer ends of the respective ladders, and means for propelling the cars along said tracks and for manipulating the ladders and operating the buckets including sprocket-chain gearing having wheels concentric with each of said pivots and fulcrum guides.

11. In a channel excavating apparatus, the combination of a pair of tracks parallel with each other on opposite sides of the channel, a pair of cars movable endwise on said tracks respectively and each constructed with a central compartment open at the bottom and sides of the car and provided with slidable fulcrums and arc-shaped guides therefor within such compartment, a bridge connecting said cars at their top, a pair of ladders beneath said bridge pivotally connected with the respective cars by pivots movable in said fulcrums and also movable therewith within said central compartment, said ladders being connected with each other midway between the cars by a hinge joint and extending outward beyond the respective cars, an endless series of scraping and conveying buckets supported by each of said ladders and discharging at the outer ends of the respective ladders, means for propelling the cars, and car-supported means for manipulating the ladders and operating the buckets including sprocket-chain gearing having wheels concentric with each of said pivots and fulcrum guides.

12. In a channel excavating apparatus, the combination of a pair of tracks parallel with each other on opposite sides of the channel, a pair of cars movable endwise on said tracks respectively and each constructed with a central compartment open at the bottom and sides of the car and provided with slidable fulcrums and arc-shaped guides therefor within such compartment, a bridge connecting said cars at their top, a pair of ladders beneath said bridge pivotally connected with the respective cars by pivots movable in said fulcrums and also movable therewith within said central compartment, said ladders being connected with each other midway between the cars by a hinge joint and extending outward beyond the respective cars, an endless series of scraping and conveying buckets supported by each of said ladders and discharging at the outer ends of the respective ladders, and means carried by the cars for propelling them along said tracks and for manipulating the ladders and operating the buckets including sprocket-chain gearing having wheels concentric with each of said pivots and fulcrum guides.

13. In a channel excavating apparatus, the combination of a pair of cars movable parallel with the line of cut, a bridge connecting said cars with each other, a ladder pivotally connected with one or each of the cars, an endless series of buckets supported by said ladder, car-supported means common to both cars for propelling the cars including a coupling and synchronizing cable connecting the mechanism in the respective cars by way of said bridge, and means for manipulating the ladder or ladders and operating the buckets.

14. In a channel excavating apparatus, the combination of a pair of cars movable parallel with the line of cut, a bridge connecting said cars with each other, a ladder pivotally connected with one or each of the cars, an endless series of buckets supported by said ladder, means for propelling the cars and manipulating the ladder or ladders, and car-supported means common to both cars for operating the buckets including a coupling and synchronizing cable connecting the mechanism in the respective cars by way of said bridge.

15. In a channel excavating apparatus, the combination of a pair of cars movable parallel with the line of cut, a bridge connecting said cars with each other, a ladder pivotally connected with one or each of the cars, an endless series of scraping and conveying buckets supported by said ladder, and car-supported means common to both cars for propelling the cars and for manipulating the ladder or ladders and operating the buckets, including coupling and synchronizing cables connecting the car-propelling mechanism and the bucket-operating mechanism respectively in the two cars by way of said bridge.

16. In a channel excavating apparatus, the combination of a pair of cars movable endwise or sidewise at will and having swiveled trucks and hollow king bolts, a bridge connecting said cars with each other, a ladder pivotally connected with one or each of the cars, an endless series of scraping and conveying buckets supported by said ladder, car-supported means for propelling the cars including a motor-driven shaft concentric with each truck extending downward through said king bolts, bevel gears connecting said shafts with a countershaft within each truck and worm gearing transmitting motion from each countershaft, ladder manipulating means, and means for operating the buckets.

17. In a channel excavating apparatus, the combination of a pair of cars movable endwise or sidewise at will and having swiveled trucks and hollow king bolts, a bridge connecting said cars with each other, a ladder pivotally connected with one or each of the cars, an endless series of scraping and conveying buckets supported by said ladder, car-supported means for propelling the cars including a motor-driven shaft concentric with each truck extending downward through said king bolts, bevel gears connecting said shafts with a countershaft within each truck and worm gearing connecting said countershafts with each axle of the trucks, ladder manipulating means, and means for operating the buckets.

18. In a channel excavating apparatus, the combination of a pair of cars movable endwise or sidewise at will and having swiveled trucks and hollow king bolts, a bridge connecting said cars with each other, a ladder pivotally connected with one or each of the cars, an endless series of scraping and conveying buckets supported by said ladder, car-supported means common to both cars for propelling the cars, including a motor-driven shaft concentric with each truck extending downward through said king bolts, bevel gears connecting said shafts with a countershaft within each truck and worm gearing transmitting motion from each countershaft, means for coupling and synchronizing the car-propelling mechanism of the two cars, ladder manipulating means, and means for operating the buckets.

19. In a channel excavating apparatus, the combination of a pair of cars movable parallel with the line of cut, a bridge connecting said cars with each other, a ladder beneath said bridge pivotally connected with one or each of the cars, an endless series of scraping and conveying buckets supported by said ladder, means for propelling the cars, and car-supported means common to both cars for manipulating the ladder or ladders and operating the buckets, including a windlass supported by each car, a central beam supported by the bridge, a yoke attached to the ladder or ladders and blocks and tackle connecting said beam and yoke and operated by said windlasses.

20. In a channel excavating apparatus, the combination of a pair of cars movable parallel with the line of cut, a bridge connecting said cars with each other, a ladder beneath said bridge pivotally connected with one or each of the cars, an endless series of scraping and conveying buckets supported by said ladder, car-supported means for propelling the cars, and car-supported means common to both cars for manipulating the ladders and operating the buckets including a windlass supported by each car, a central beam supported by the bridge, a yoke attached to the ladder or ladders and blocks and tackle connecting said beam and yoke and operated by said windlasses.

21. In a channel excavating apparatus, the combination of a pair of cars movable parallel with the line of cut, a bridge connecting said cars with each other, a pair of ladders beneath said bridge pivotally connected with the respective cars, connected with each other midway between the cars by a hinge joint and having their dump ends beyond the respective cars, an endless series of scraping and conveying buckets supported by each of said ladders, and car-supported means common to both cars for propelling the cars and for manipulating the ladders and operating the buckets, including a windlass supported by each car, a central beam supported by the bridge, a yoke attached to the ladders at said hinge joint and blocks and tackle connecting said beam and yoke and operated by said windlasses.

22. In a channel excavating apparatus, the combination of a pair of cars movable parallel with the line of cut, a bridge connecting said cars, a ladder pivotally connected with one or each of the cars and provided with a cable driving shaft at the dump end and with cable-carrying wheels and bucket guides, endless cables carrying a series of scraping and conveying buckets supported and guided by said ladder, and means for propelling the cars and for manipulating the ladder and operating its cable-driving shaft.

23. In a channel excavating apparatus, the combination of a pair of cars movable parallel with the line of cut, a bridge connecting said cars, a ladder pivotally connected with one or each of the cars and provided with a cable-driving shaft at the dump end and with cable-carrying wheels and bucket guides, endless cables carrying a series of scraping and conveying buckets frictionally attached to said cables, and means for propelling the cars and for manipulating the ladder and operating its cable-driving shaft.

24. In a channel excavating apparatus, the combination of a pair of cars movable parallel with the line of cut, a bridge connecting said cars, a ladder pivotally connected with one or each of the cars and provided with a cable-driving shaft at the dump end and with cable-carrying wheels and bucket guides, endless cables supported by said wheels, scraping and conveying buckets each provided with guide-roller axles near its respective ends and with frictional cable-embracing clamps having clamping members movable on said axles, and means for propelling the cars and for manipulating the ladder and operating its cable-driving shaft.

25. The combination, in an excavating apparatus, of a car movable parallel with the line of cut, a ladder having a horizontal pivot and movable on fulcrums carried by said car, an endless series of scraping and conveying buckets supported by said ladder, and means for propelling the car and for manipulating the ladder and operating the buckets.

26. The combination, in an excavating apparatus, of a car movable parallel with the line of cut, a ladder having a horizontal pivot and movable on fulcrums carried by said car, an endless series of scraping and conveying buckets supported by said ladder, car-supported means for propelling the car, and means for manipulating the ladder and operating the buckets.

27. The combination, in an excavating apparatus, of a car movable parallel with the line of cut, a ladder having a horizontal pivot and movable on fulcrums carried by said car, an endless series of scraping and conveying buckets supported by said ladder, and car-supported means for propelling the car and for manipulating the ladder and operating the buckets.

28. The combination, in an excavating apparatus, of a car movable endwise parallel with the line of cut and constructed with a central compartment open at the bottom and sides of the car, a ladder having a horizontal pivot and movable on fulcrums carried by said car within such compartment, an endless series of scraping and conveying buckets supported by said ladder, and means for propelling the car and for manipulating the ladder and operating the buckets.

29. The combination, in an excavating apparatus, of a car movable endwise parallel with the line of cut and constructed with a central compartment open at the bottom and sides of the car, a ladder having a horizontal pivot and movable on fulcrums carried by said car within such compartment, an endless series of scraping and conveying buckets supported by said ladder, car-supported means for propelling the car, and means for manipulating the ladder and operating the buckets.

30. The combination, in an excavating apparatus, of a car movable endwise parallel with the line of cut and constructed with a central compartment open at the bottom and sides of the car, a ladder having a horizontal pivot and movable on fulcrums carried by said car within such compartment, an endless series of scraping and conveying buckets supported by said ladder, and car-supported means for propelling the car and for manipulating the ladder and operating the buckets.

31. The combination, in an excavating apparatus, of a car movable endwise or sidewise at will and provided with swiveled trucks and hollow king bolts, a ladder having a horizontal pivot and movable on fulcrums carried by the car, an endless series of scraping and conveying buckets supported by said ladder, car-supported means for propelling the car including a motor-driven vertical shaft concentric with each truck extending downward through said king bolts, bevel gearing connecting said vertical shafts with countershafts within the respective trucks and worm gearing transmitting motion from said countershafts, and means for manipulating the ladder and operating the buckets.

32. The combination, in an excavating apparatus, of a car movable endwise or sidewise at will and provided with swiveled trucks and hollow king bolts, a ladder having a horizontal pivot and movable on fulcrums carried by the car, an endless series of scraping and conveying buckets supported by said ladder, car-supported means for propelling the car including a motor-driven vertical shaft concentric with each truck extending downward through said king bolts, bevel gearing connecting said vertical shafts with countershafts within the respective trucks and worm gearing transmitting motion from said countershafts to both axles of each truck, and means for manipulating the ladder and operating the buckets.

33. The combination, in an excavating apparatus, of a car movable endwise or sidewise at will and provided with swiveled trucks and hollow king bolts, a ladder having a horizontal pivot and movable on fulcrums carried by the car, an endless series of scraping and conveying buckets supported by said ladder, car-supported means for propelling the car including a motor-driven vertical shaft concentric with each truck extending downward through said king bolts, bevel gearing connecting said vertical shafts with countershafts within the respective trucks and worm gearing transmitting motion from said countershafts to one or each axle of each truck, and car supported means for manipulating the ladder and operating the buckets.

34. The combination, in an excavating apparatus, of a car movable parallel with the line of cut, a ladder having a horizontal pivot movable in fulcrums carried by said car and provided with a cable-driving shaft at its dump end and with bucket guides, endless cables carrying a series of scraping and conveying buckets supported and guided by said ladder, and means for propelling the car and for manipulating the ladder and operating said cable-driving shaft.

35. The combination, in an excavating apparatus, of a car movable parallel with the line of cut, a ladder having a horizontal pivot movable in fulcrums carried by said car, and provided with a cable-driving shaft and cable wheels at its dump end and with bucket guides, endless cables driven by said wheels, scraping and conveying buckets frictionally attached to said cables and having guide rollers interacting with said bucket guides, and means for propelling the car and for manipulating the ladder and operating said cable driving shaft.

36. The combination, in an excavating apparatus, of a car movable parallel with the line of cut, a ladder having a horizontal pivot movable in fulcrums carried by said car, and provided with a cable-driving shaft and cable wheels at its dump end and with bucket guides, endless cables driven by said wheels, scraping and conveying buckets each provided with guide-roller axles near its respective ends and with frictional clamps embracing said cables, and having clamping members movable on said axles, and means for propelling the car and for manipulating the ladder and operating said cable driving shaft.

37. The combination, in an excavating apparatus, of a ladder provided with a cable-driving shaft at its dump end and with bucket guides, endless cables carrying a series of scraping and conveying buckets supported and guided by said ladder, and means for operating said cable-driving shaft.

38. The combination, in an excavating apparatus, of a ladder provided with a cable-driving shaft and cable wheels at its dump end and with bucket guides, endless cables driven by said wheels, scraping and conveying buckets frictionally attached to said cables and having guide rollers interacting with said bucket guides, and means for operating said cable driving shaft.

39. The combination, in an excavating apparatus, of a ladder provided with a cable driving shaft and cable wheels at its dump end and with bucket guides, endless cables driven by said wheels, scraping and conveying buckets each provided with guide-roller axles near its respective ends and with frictional clamps embracing said cables, and with clamping members movable on said axles, and means for operating said cable driving shaft, substantially as hereinbefore specified.

EDWIN A. NEWMAN.

Witnesses:
S. A. TERRY,
N. L. EWIN.